Patented Apr. 19, 1932

1,854,581

UNITED STATES PATENT OFFICE

WILLIAM ENGS AND RICHARD Z. MORAVEC, OF BERKELEY, CALIFORNIA, ASSIGNORS TO SHELL DEVELOPMENT COMPANY, OF SAN FRANCISCO, CALIFORNIA, A CORPORATION OF DELAWARE

PRODUCTION OF DIBUTYL SULPHATE

No Drawing. Application filed June 20, 1930. Serial No. 462,700.

This invention relates to the production of higher dialkyl sulphates from gases containing the corresponding olefine, by contact with sulphuric acid, more particularly to the production of dialkyl sulphates containing four or more carbon atoms in each alkyl group, especially dibutyl sulphate. The process of the invention consists in the contacting of an excess of the olefine with sulphuric acid of 90 to 100% concentration, at normal temperature.

Below we will describe our invention more particularly in relation to the production of dibutyl sulphate, without however, limiting ourselves thereto as this is only one example of the possible applications of our invention.

It is known that when isomeric 1 and 2 butenes, which are gases at ordinary temperature and pressure, are absorbed in sulphuric acid they react with the acid to form butyl hydrogen sulphate, which, on hydrolysis, gives secondary butyl alcohol. This is the basis of existing processes for the production of this commercially valuable alcohol in which usually butene as a gas is passed through the acid. It is further known that for successful operation of these processes the strength of the sulphuric acid is an important factor. If concentrated acid of 90% or more $H_2SO_4$ is employed a large part of the butene or of the formed butyl hydrogen sulphate is polymerized, and tarry resinous bodies are formed by side reactions. It has therefore always been considered necessary to use a more or less diluted acid. On the other hand, the acid must not be too dilute since the more dilute acid, the slower is its reaction with butene. According to all publications and patents mentioning the concentration of the acid to be used, an acid of 75% to 80% is most advantageous, as giving a reasonable reaction rate and at the same time avoiding undesirable side reactions in the absorption of the butene. Further, it is mentioned to be advisable to operate at temperatures below zero, even as low as $-20°$ or $-25°$ C., when it is intended to use a somewhat stronger acid.

We have now discovered that when concentrated sulphuric acid is caused to react with 1 or 2 butene while there are present at least 2 molecules of butene to each molecule of acid, the reaction produces dibutyl sulphate, the conversion taking place without appreciable side reactions or polymer formation. The concentration of sulphuric acid most advantageous for this reaction is from 90% to 100%, a concentration which has previously been regarded as conducive to polymerization and other side reactions and therefore objectionable for reaction with butene. When 100% $H_2SO_4$ is employed for the reaction it is converted practically quantitatively to the dibutyl sulphate. When, however, the acid is diluted some butyl hydrogen sulphate is formed, the greater the dilution the greater being the proportion of butyl hydrogen sulphate to dibutyl sulphate. Within the concentrations of 90% to 100% $H_2SO_4$, the product is, however, substantially dibutyl sulphate, only a few per cent of butyl hydrogen sulphate being formed at the lower limit of acid concentration. The requirement of having at least 2 molecules of butene to each molecule of acid at the reaction surfaces necessitates the use of such a quantity of butene in proportion to sulphuric acid, as was under the known practice considered a large excess for the butyl hydrogen sulphate reaction.

By passing gaseous butene through the acid, as hitherto practised, it is impossible to maintain throughout the reaction zone the requisite proportions of butene to acid and side reactions occur. In order to insure the requisite "excess" of butene in contact with the acid, we have preferably used liquid butene and agitated this violently with the sulphuric acid in order to produce an intimate emulsion of the desired proportions. It will be understood that this has to be done under sufficient pressure to keep the butene in liquid condition; at a temperature of about 20° C. this will require about 20 lbs. pressure, at 30° C. about 40 lbs., if butene free from propane is used. Preferably we use only just sufficient pressure. We find that for our process it is not necessary to use low temperatures; we have successfully operated at temperatures of 20° C. and even up to 30° C. We prefer not to use higher temperatures, as above 30° C. side reactions begin to occur and the yield of dibutyl sulphate progressively decreases. Without wishing to limit ourselves to such an explanation we believe that the reaction speed at which dibutyl sulphate is formed, by contacting concentrated acid with an excess of butene, is so great as to preclude the undesirable side reactions which occur with the production of butyl hydrogen sulphate when using strong acid without an excess of butene. This high reaction speed is the result of the high acid concentration, together with the intimate contact in the requisite proportions of the reacting materials. The increase in the reaction speed is illustrated by the following: when liquid butene is violently agitated with an excess of 80% sulphuric acid to form butyl hydrogen sulphate, the reaction is comparatively slow and requires 30 to 40 minutes for completion, but when an excess of butene is agitated in the same way with 95% sulphuric acid the reaction is completed almost instantaneously or at most in 1 or 2 minutes.

The reaction may be successfully carried out as well with pure 1 and 2 butene or with mixtures containing butene such as for example, with the appropriate fraction obtained by liquefaction and fractional distillation of the gases from a petroleum cracking plant, this fraction containing butene together with butane. Care has to be taken, however, that iso-butene and all other olefines containing a carbon atom with no hydrogen attached to it, are as far as possible removed from the mixture before contacting it with concentrated sulphuric acid, as the reaction thereof with such acid is very violent. These iso-olefines can be removed by known methods as by fractionate or by a preliminary treatment with weak acid of 65% to 70% concentration, or by some polymerizing agent as fuller's earth.

During the course of the reaction, the two liquid phases of sulphuric acid and hydrocarbon which exist initially disappear and a single phase remains consisting of dibutyl sulphate, together with any excess butene and the butane; if any butyl hydrogen sulphate is formed, it will, if butane or excess butene are present, form a small second layer, otherwise the butyl hydrogen sulphate will remain dissolved in the dibutyl sulphate. On releasing the pressure, the unreacted butene and the butane vaporize, and may be removed, leaving a substantially pure dibutyl sulphate.

The dibutyl sulphate so formed is a neutral liquid, and is a valuable intermediate product for further chemical reactions or syntheses. For example, it may be hydrolyzed to give secondary butyl alcohol or ether, or may be used in many organic syntheses as an alkylating agent.

The method of agitating liquid butene with sulphuric acid is the method we prefer to contact the acid instantaneously with sufficient butene, but other methods may be employed, as spraying the acid into the gaseous butene or injecting it in the liquid butene in minute streams; still other methods may be devised by those skilled in the art.

We have further found that the method of our invention is equally applicable to the olefines of higher molecular weight than butene and that the corresponding dialkyl sulphates are similarly formed while avoiding the polymerization of the acid alkyl sulphates. For example, 2 pentene will yield diamyl sulphate by the process of our invention.

Regarding the olefines of molecular weight lower than butene, little or no side reactions take place when passing these in an excess of sulphuric acid, so that the corresponding dialkyl sulphates can be produced without danger of polymerization by passing the olefine gas directly into concentrated sulphuric acid of 90% to 100% until the requisite amount is absorbed and it is not necessary to resort to the process of our invention to avoid polymerization and other side reactions; the known diethyl and dipropyl sulphates, for instance, are produced in such manner.

It will be clear if we use a butene containing gas mixture for the production of dibutyl sulphate by the process of our invention, which gas mixture contains also some higher and lower olefines, that the corresponding higher and lower dialkyl sulphates will be found as impurities in the dibutyl sulphate formed.

We claim as our invention:

1. A process of producing dialkyl sulphates from olefines containing four or more carbon atoms, comprising: contacting about two molecules of the olefines with one molecule of concentrated sulphuric acid.

2. A process of producing dialkyl sulphates from olefines containing four or more carbon atoms, comprising: contacting the olefines with sulphuric acid of 90% to 100% concentration in molecular proportion of at least two to one molecule of acid.

3. A process of producing dialkyl sulphates from olefines containing four or more carbon atoms, comprising: contacting the liquefied olefines with concentrated sulphuric acid under pressure at substantially normal temperature, in molecular proportion of at least two to one molecule of acid.

4. A process of producing dialkyl sulphates from olefines containing four or more carbon atoms, comprising: removing any iso-olefines present, and thereafter contacting the olefines with sulphuric acid of 90% to 100% concentration in molecular proportion of at least two to one molecule of acid.

5. A process of producing dialkyl sulphates from a mixture of hydrocarbons containing olefines with four or more carbon atoms, comprising: removing from the mixture any iso-olefines present and thereafter contacting the mixture of hydrocarbons with acid of 90% to 100% concentration in molecular proportion of at least two molecules of olefine to each molecule of acid present.

6. A process of producing dibutyl sulphate from 1 and 2 butene comprising: contacting the butene with sulphuric acid of 90% to 100% concentration in molecular proportion of at least two to one.

7. A process of producing secondary butyl alcohol from 1 and 2 butene comprising: contacting the butene with sulphuric acid of 90% to 100% concentration in molecular proportion of at least two to one, and hydrolyzing the dibutyl sulphate formed.

8. A process of producing dialkyl sulphates from olefines containing not less than four carbon atoms to the molecule comprising intimately contacting at least two molecules of the olefines for each molecule of concentrated sulfuric acid at substantially normal temperature.

9. A process of producing dialkyl sulphates from a mixture of paraffins and olefines containing olefines with more than three carbon atoms to the molecule, comprising removing from the mixture any iso-olefines present and thereafter contacting the mixture of paraffins and olefines with sulphuric acid of about 90% to 100% concentration in the proportion of at least two molecules of olefine per molecule of acid.

10. A process of producing dibutyl sulphate from a mixture of butane and butylenes comprising removing from the mixture any iso-olefines present and thereafter contacting the mixture with sulphuric acid of about 90% to 100% concentration in the proportion of at least two molecules of olefine per molecule of acid.

11. A process of producing dibutyl sulphate from a liquefied mixture of butane and butylenes from which iso-olefines have been selectively removed, comprising contacting the liquefied mixture with sulphuric acid of about 90% to 100% concentration in the proportion of at least two molecules of olefine per molecule of acid.

12. A process of producing dibutyl sulphate from liquid 1 and 2 butene comprising contacting the liquid butene with sulphuric acid of about 90% to 100% concentration in the proportion of at east two molecules of olefine per molecule of acid.

In testimony whereof, we have hereunto set our hands.

WILLIAM ENGS.
RICHARD Z. MORAVEC.